United States Patent [19]

Bircann et al.

[11] Patent Number: 5,685,519
[45] Date of Patent: Nov. 11, 1997

[54] EXHAUST GAS RECIRCULATION VALVE

[75] Inventors: Raul Armando Bircann, Penfield; Dwight Orman Palmer, Rochester, both of N.Y.

[73] Assignee: General Motors Corporation, Detroit, Mich.

[21] Appl. No.: 645,317

[22] Filed: May 13, 1996

Related U.S. Application Data

[63] Continuation of Ser. No. 304,652, Sep. 9, 1994, abandoned.

[51] Int. Cl.$^6$ .................................................. F16K 31/06
[52] U.S. Cl. ........................................ 251/129.15; 251/366
[58] Field of Search .............................. 251/129.15, 366, 251/367; 123/571; 335/255, 262

[56] References Cited

U.S. PATENT DOCUMENTS

| | | |
|---|---|---|
| 2,629,007 | 2/1953 | Forman . |
| 3,625,474 | 12/1971 | Juede ........................ 251/129.15 X |
| 4,044,324 | 8/1977 | Coors . |
| 4,198,030 | 4/1980 | Jackson et al. . |
| 4,363,463 | 12/1982 | Moon, Jr. . |
| 4,805,582 | 2/1989 | Braun et al. . |
| 5,020,505 | 6/1991 | Grey et al. . |

FOREIGN PATENT DOCUMENTS

| | | |
|---|---|---|
| 3309904 A1 | 9/1984 | Germany . |
| 2256977 | 10/1990 | Japan . |
| 5106520 | 4/1993 | Japan . |
| 6249083 | 9/1994 | Japan . |

OTHER PUBLICATIONS

Lequesne B., "Finite Element Analysis Of A Constant Force Solenoid For Fluid Flow Control" Oct. 1987, Conference Record of the Industry Applications Society Annual Meeting, pp. 46–51.

*Primary Examiner*—Kevin Lee
*Attorney, Agent, or Firm*—Karl F. Barr, Jr.

[57] ABSTRACT

A valve assembly is disclosed for metering exhaust gas to the intake manifold of an internal combustion engine. The valve assembly has a base which includes a passage communicating between the intake manifold and the exhaust manifold of the engine. The passage has a valve seat which is operable with a valve member to meter the flow of exhaust gas through the passage to the intake manifold. An actuator assembly is mounted to the base and is operably connected to the valve member to move the valve member into and out of engagement with the valve seat. The actuator assembly is constructed of an extruded housing having sides a bottom and support members extending from the bottom to position the actuator relative to the base. A stepped extension also extends from the bottom of the actuator housing and is press fit into an opening in the top of the base member to define a sealed passage for the valve stem between the base member and the actuator. The stepped extension may include a bearing to support the valve stem within the actuator and seal against leakage of exhaust gas from the base to the actuator.

8 Claims, 7 Drawing Sheets

EXHAUST GAS RECIRCULATION VALVE

This is a continuation of application Ser. No. 08/304,652 filed on 09 Sep. 1994, now abandoned.

TECHNICAL FIELD

The invention relates to a valve assembly for metering exhaust gas to the intake of an internal combustion engine and, particularly, to such a valve assembly having a valve base and actuator housing which define a virtual seal against leakage out of the valve assembly.

BACKGROUND

Exhaust gas recirculation (EGR) valves are employed in connection with internal combustion engines to aid in the lowering of regulated emissions and to enhance fuel economy by metering exhaust gas to the intake manifold for delivery to the combustion chamber. In the exhaust gas recirculation valve assembly set forth in U.S. Pat. No. 5,020,505 issued Jun. 04, 1991, to Grey et al., a base assembly contains a valve member in engagement with a valve seat. The base supports an actuator assembly including a linear, electromagnetic solenoid actuator which is operable to move the valve member relative to the valve seat to regulate the flow of exhaust gas therethrough. Critical to the operation of the disclosed EGR valve is the bearing function which provides both guidance and sealing against leakage of gasses in or out of the base. Fixed-type bearings such as are disclosed in the above referenced device may often place considerable frictional loads on the valve stem requiring the use of a larger than optimum actuator in order to overcome the resultant parasitic load. Larger actuators may, in turn, incur mass, power consumption, installation, durability, cost and robustness penalties.

The desirability of a valve stem seal having minimum leakage may run counter to common design criteria for a journal-type bearing which typically will require appreciable clearance at the valve stem/bearing interface in order to limit binding between components. Such clearance, however, will result in added leakage at the interface conflicting with the desire to limit emissions of untreated engine exhaust. In such applications, a compromise is reached where a maximum leakage quantity is tolerated in order to minimize friction between the bearing and the valve stem. Such acceptable leakage rates may be conducive to actuator corrosion caused by condensation of highly corrosive exhaust gas escaping through the bearing seal. Additionally, in an environment of ever-tightening emission regulations for internal combustion engines, previously acceptable leakage rates become unacceptably high, further limiting the bearing/valve stem tolerances.

Optimum design criteria dictates that, to preclude carbon encrustation on the valve member and detrimental condensation of exhaust gases within the actuator, the valve member should open outwardly, away from its seat and into the exhaust flow, with exhaust backpressure on its lower face and manifold pressure on its upper face. However, such an arrangement is presently not permitted due to undesirable amounts of unmetered air ingested by the engine due to leakage of external, unmetered air past the bearing seal caused by the relatively large resultant pressure differential between the manifold and the atmosphere. Such leakage adversely impacts engine performance, emissions, and fuel economy.

SUMMARY OF THE INVENTION

The present invention is directed to an improved exhaust gas recirculation (EGR) valve for use with an internal combustion engine in which exhaust gasses are metered to the intake side of the engine.

The invention incorporated into the EGR valve disclosed herein addresses the indicated shortcomings of typical EGR valve designs through the use of an EGR base and actuator assembly in which the actuator housing employs an integral valve stem passage configured to form a seal with the EGR valve base. The sealed interface prevents egress of exhaust gas from the valve to the atmosphere or, conversely, ingress of unmetered atmospheric air through the valve to the engine intake.

In a preferred embodiment, the actuator housing receives a bearing which is operable to align the valve stem within the valve base and to define a seal between the base and the housing. Radial clearance between the bearing and the actuator housing, allows side-to-side or radial movement of the valve and stem while the sealing action of the bearing member occurs through close tolerance between the valve stem and the bearing and, in addition, by a face seal between the bearing and the actuator housing. Sealing between the bearing and the housing is maintained regardless of radial movement of the bearing in the housing.

The EGR base, through which exhaust gas is metered to the intake manifold, is constructed of multiple, powder metal components which are assembled in the green stage following compaction and shaping. Following assembly, the components are fused together by a heating process to form a homogeneous base member. The base member assembled in this manner requires no cover as in prior designs and, consequently avoids sealing concerns inherent with such an assembly. In addition, the base member is constructed to allow maximum commonality of parts and application flexibility since, during assembly, various base and valve seat components may be chosen to allow for different applications of the EGR valve.

Elimination of a leakage path between the actuator assembly and the EGR base allows the use of a flow convention in which exhaust backpressure operates on the outer face of the poppet valve while intake or manifold vacuum is present on the upper face. As such, coking effects on the valve are minimized by continually exposing the valve to the high temperatures of the exhaust gas while maintaining a predominately cool environment for the actuator through exposure to manifold vacuum during periods when the valve is closed.

The poppet valve shaft passes through the base housing, the integral valve stem passage and the bearing assembly, where the distal end of the stem is operably attached to a moveable armature disposed within the actuator. The pintle is fixed to the armature by retainers, one of which is configured to provide a failsafe mechanism to prevent the poppet valve from entering the engine intake in the case of retainer failure. Movement of the armature results in movement of the valve into and out of engagement with the valve seat allowing exhaust gas to be metered to the intake of the engine through the base.

The actuator assembly is fixed within the actuator housing and includes an improved linear solenoid having a primary pole piece with an extended magnetic path which defines a housing for the coil and bobbin assembly. A secondary pole piece completes the magnetic circuit by closing the open end of the primary pole piece.

Disposed between the armature and the pole pieces is an armature sleeve which defines a working air gap between the pieces. The sleeve includes axial slots extending the length thereof to effect communication between the captive air above and below the armature thereby minimizing the effects of pneumatic damping on actuator performance.

To insure a linear axial force versus current characteristic, the primary pole piece includes a cylindrical, tapered section. Additionally, a tapered armature end portion is provided on the end of the armature adjacent to the tapered stationary pole piece to increase axial force in the closed to partially open positions and a second taper on the inside diameter of the primary, tapered, stationary pole piece provides additional force in the open position. The added armature taper provides an additional degree of design freedom in shaping the force characteristic of the actuator.

Other objects and features of the invention will become apparent by reference to the following description and to the drawings.

DESCRIPTION OF THE PREFERRED EMBODIMENTS

Figure 1:
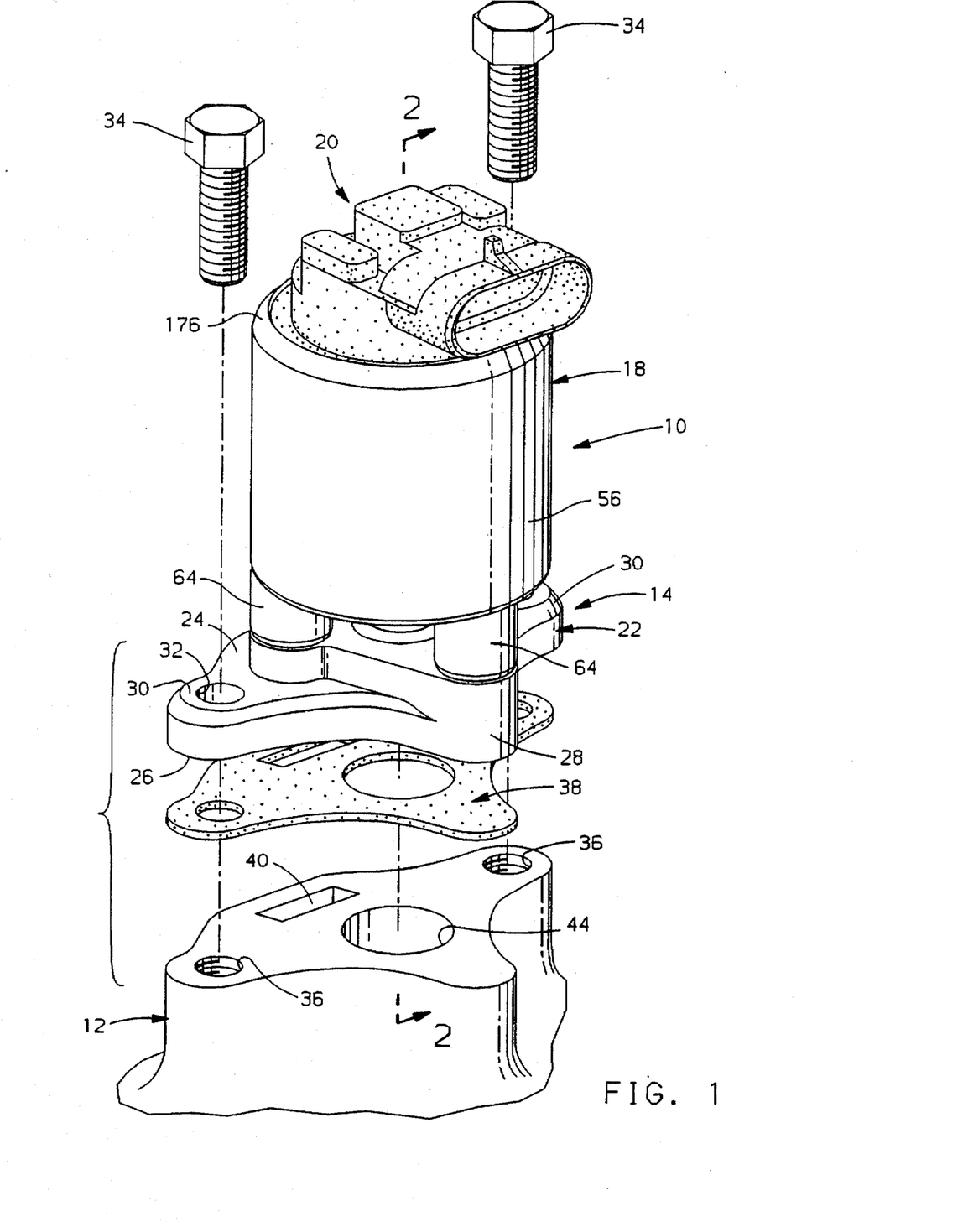
FIG. 1 is a partially expanded perspective view of an exhaust gas recirculation valve embodying features of the present invention.
Figure 2:
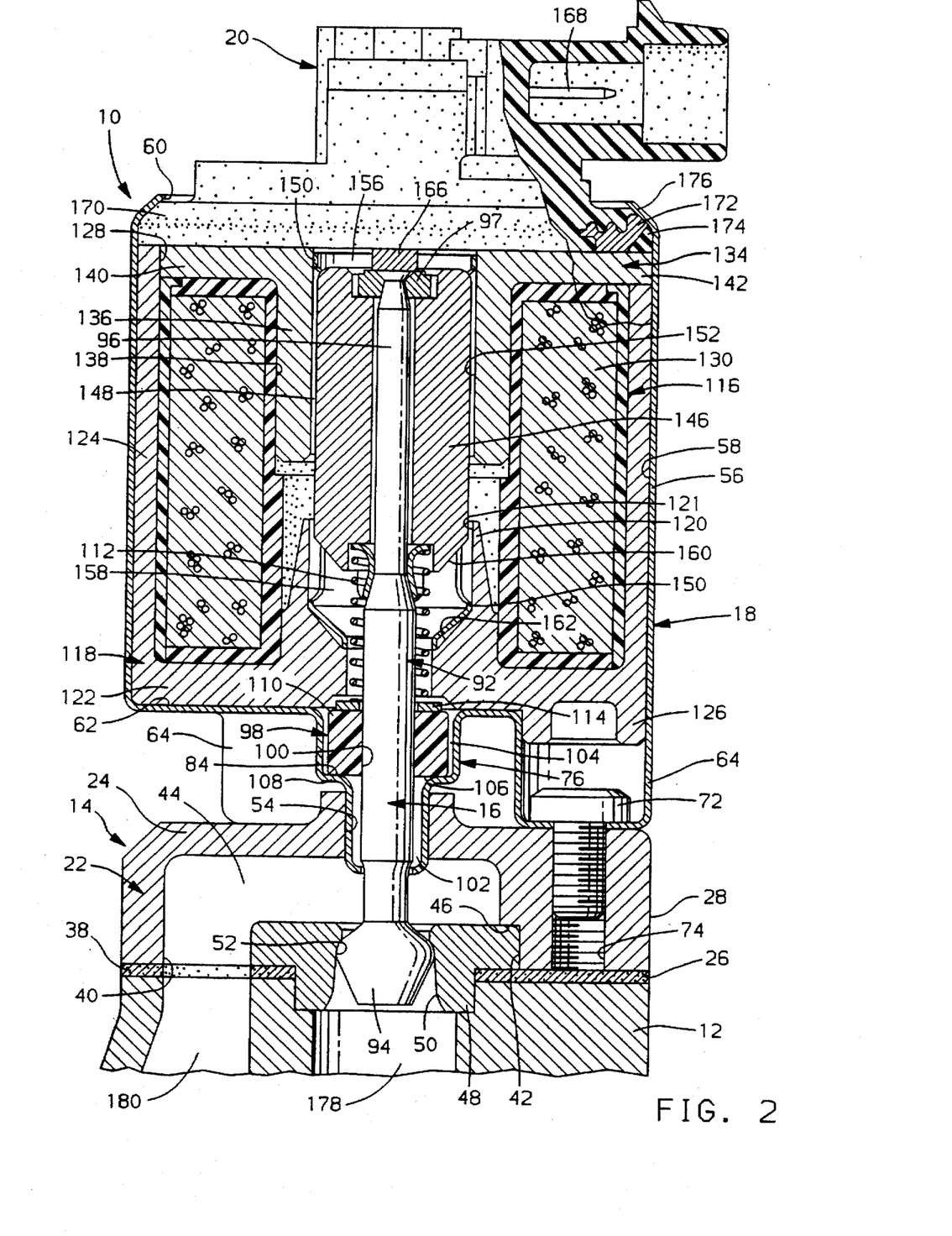
FIG. 2 is a partial, sectional view of the exhaust gas recirculation valve of FIG. 1 in a first mode of operation.

Referring first to FIGS. 1 and 2, an exhaust gas recirculation (EGR) valve, designated generally as 10, is shown for operation with an internal combustion engine 12. The EGR valve 10 comprises four principal subassemblies: the EGR base assembly 14, the valve assembly 16, the actuator assembly 18 and the pintle position sensor 20.

The EGR base assembly 14 includes a housing 22 having a top 24, a bottom 26 and sides 28. The sides have attachment wings 30 which extend outwardly and have openings 32 for the passage of attaching means such as bolts 34, which engage threaded bores 36 in the engine 12. A gasket 38 or other means for sealingly adapting the EGR valve 10 to the particular engine application may be disposed between the EGR base 14 and the engine 12. Located in the bottom 26 of housing 22 are first and second openings 40 and 42 which are interconnected by passage 44. Opening 42 is configured with a flanged rim 46 extending about the circumference thereof. The flanged opening 42 receives a valve seat insert 48 which is located by ranged rim 46. The valve seat insert has an opening 50 about which extends a valve seat 52. Located in the top 24 of the EGR housing 22 is valve stem opening 54, positioned coaxially with the opening 50 in the valve seat insert 48. In a preferred method of assembly, base housing 22 and the valve seat insert 48 are individually constructed of a powder metal material. The parts are assembled in the green stage following compaction and shaping and are subsequently fused together by heat to form a unitary, EGR base unit.

Figure 3:
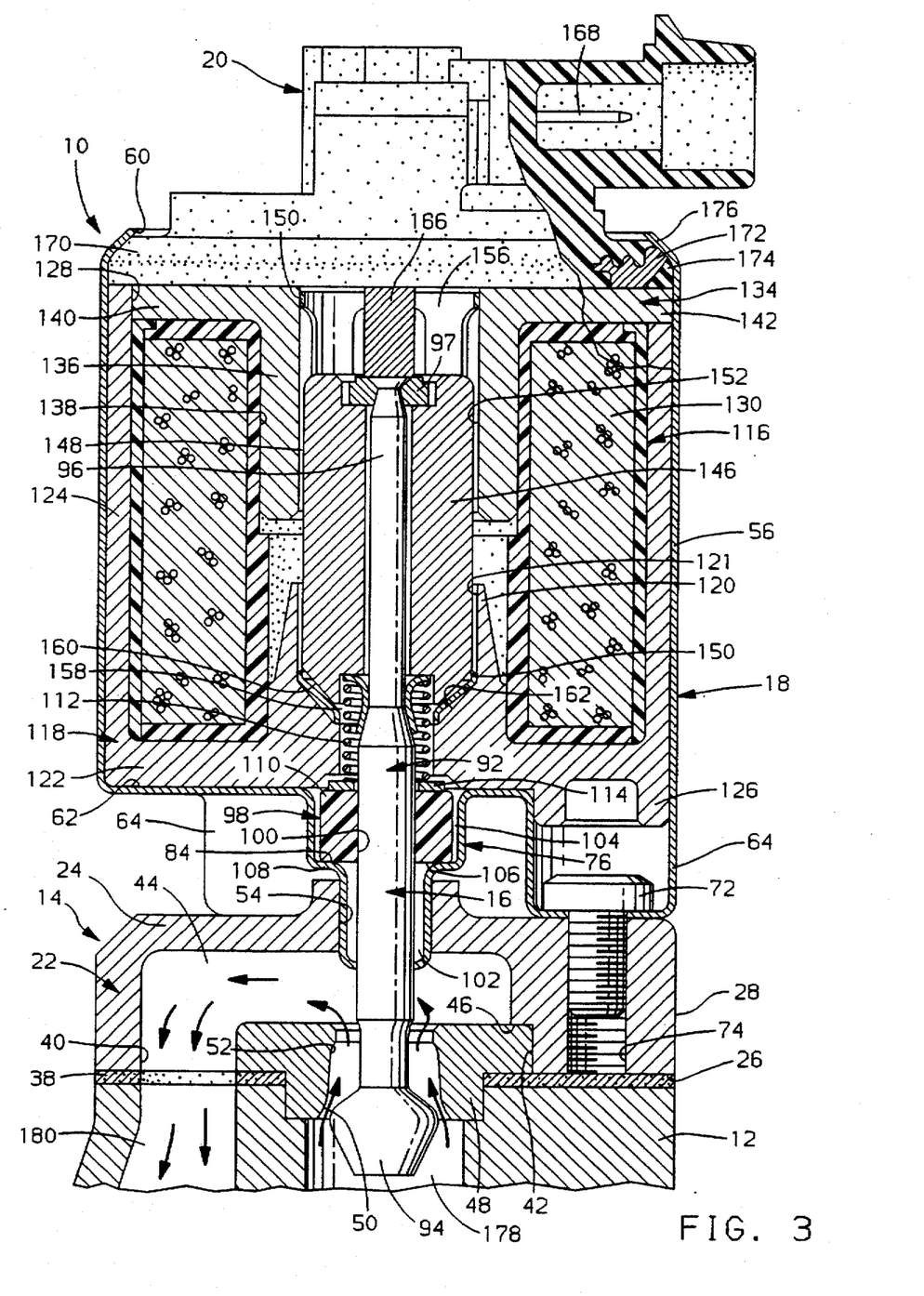
FIG. 3 is a partial, sectional view of the exhaust gas recirculation valve of FIG. 1 in a second mode of operation.
Figure 4:
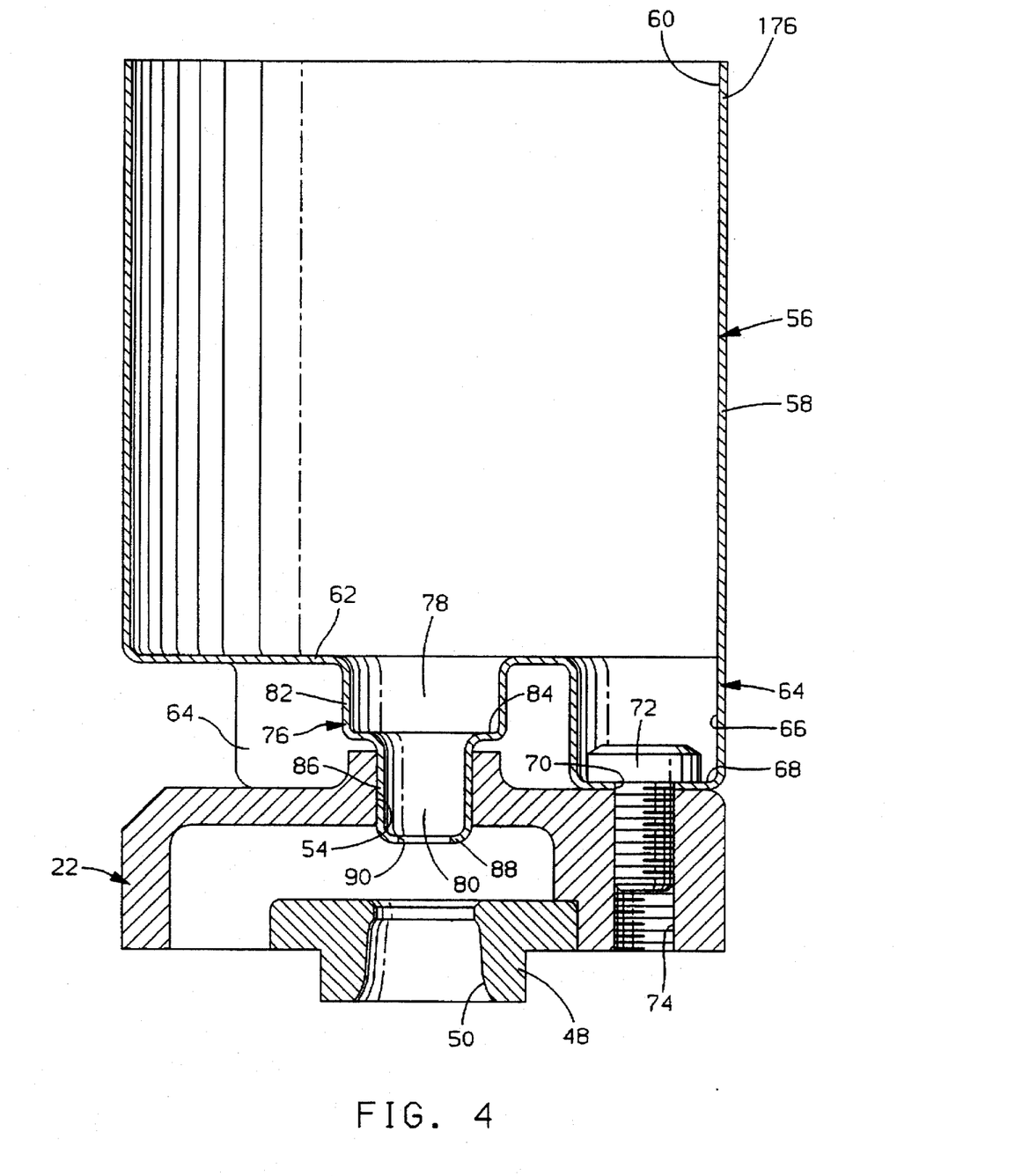
FIG. 4 is a sectional view of the exhaust gas recirculation valve of FIG. 1 with parts removed for clarity.

The actuator assembly 18 is carried in a housing member 56 which in the preferred construction shown in FIGS. 2, 3 and 4 is a single piece extrusion. The housing member 56 includes an upper cylindrical wall 58, as viewed in the Figures, defining an upper, open end 60 and a bottom or base 62. Extending downwardly from the bottom 62 of the housing member 56 are one or more support members 64 which, as shown in the Figures, are included as part of the housing extrusion, each comprising a side wall 66 and a bottom portion 68. The bottom portion 68 of each support member 64 may include an opening 70 so that the support member 64 may accommodate attachment means such as bolt 72 which, when engaged with a corresponding threaded opening 74 in EGR base assembly 14, is operable to retain the actuator housing 56 in rigid engagement therewith.

Also extending from the bottom 62 of the actuator housing 56 is a stepped extension 76 which comprises bearing housing 78 and valve stem passage 80. Both the bearing housing 78 and the valve stem passage 80 are integral with the actuator housing member 56 and, in addition, occupy a coaxial, adjacent relationship to one another. As is best illustrated in FIG. 4, bearing housing 78 comprises a walled portion 82 extending from the bottom 62 of actuator housing 56 and a shoulder or flange 84. Extending from flange 84 is a walled portion 86 comprising the valve stem passage 80. The walled portion 86 is terminated by lower wall 88 having an opening 90 for the passage of a valve stem 92 therethrough.

The actuator housing 56 is assembled to the EGR base assembly 14 by alignment of the support members 64 with the threaded openings 74 in the housing 22 and insertion of the valve stem passage 80 into the valve stem opening 54 in the top 24 thereof. The walled portion 86 of the valve stem passage 80 establishes an interference fit with the valve stem opening 54 to thereby form a sealing interface between the actuator housing 56 and the EGR housing 22.

Valve assembly 16 comprises a poppet valve having an axially extending, cylindrical valve stem 92 with a valve head 94 at a first end thereof. The second, distal end 96 of the valve stem 92 extends through the opening 50 in valve seat 48, and through the valve stem passage 80 and the bearing housing 78 to terminate at a location near the upper, open end 60 of the wall portion 58 of the actuator housing 56. The valve head 94 and seat 52 are preferably configured to provide a high resolution flow curve to maximize flexibility of the EGR valve to deliver varying EGR flow requirements. In addition, the valve profile minimizes exhaust gas flow turbulence, reducing the possibility of carbon deposits on the seating surfaces between the valve 94 and the valve seat 52.

A valve stem bearing 98 is received in the bearing housing 78 and has a bearing opening 100 through which the valve stem 92 passes. The bearing opening 100 has a diameter which will support axial movement of the stem 92 in the bearing while minimizing leakage of exhaust gas at the interface thereof. The bearing 98 is constructed of a rigid material such as bronze or a suitable, high temperature polymer having a high lubricity such as the high molecular weight fluorocarbons. A preferred fluorocarbon is polytetrafluroethylene (e.g., Teflon by Dupont Co.).

As is shown in FIGS. 2 and 3, radial clearances 102,104 are established between the valve stem 92 and the wall 86 of the valve stem passage 80 and between the bearing 98 and the wall 82 of the bearing housing 78, respectively. The bearing 98 is not fixed in position but is free to float, to a limited extent, utilizing clearances 102,104 to allow radial movement of the valve stem 92 occurring as a result of such factors as actuator variabilities or operation-caused wear. The side-to-side movement facilitated by the floating bearing allows the interface between the bearing opening 100 and the valve stem 92 to be of an extremely close tolerance, virtually eliminating gas leakage into the actuator assembly.

In addition to the sealing interface established between the valve stem 92 and the bearing opening 100, a face seal is defined between the lower surface 106 of the bearing member 98 and the shoulder 84 of the bearing housing. By placing the sealing surface normal to the direction of valve stem movement a rigid, or press fit is not required between the bearing 98 and the wall 82 of the bearing housing 78 thereby permitting the utilization of the clearance 104 to accommodate radial movement of the valve stem and bearing. In order to maintain a leak-free seal about the face seal, a biasing force is exerted on the upper surface 110 of the bearing 98 by a biasing member such as compression spring 112. The spring force exerted on the bearing is sufficient to maintain a tight face seal between bearing surface 106 and shoulder 84 while permitting the bearing to move in the desired, radially aligning fashion. It may be desirable to interpose a slip surface using an intermediate washer or disk 114 between the spring member 112 and the upper surface 110 of the bearing 98. The washer 114 has an upper surface contacting the spring member and a lower surface, in communication with the upper surface 110 of the bearing 98 to define a slip surface therebetween. The use of washer 114 prevents binding between the spring 112 and the bearing 98 which could impede free radial movement of the bearing member.

Figure 5:
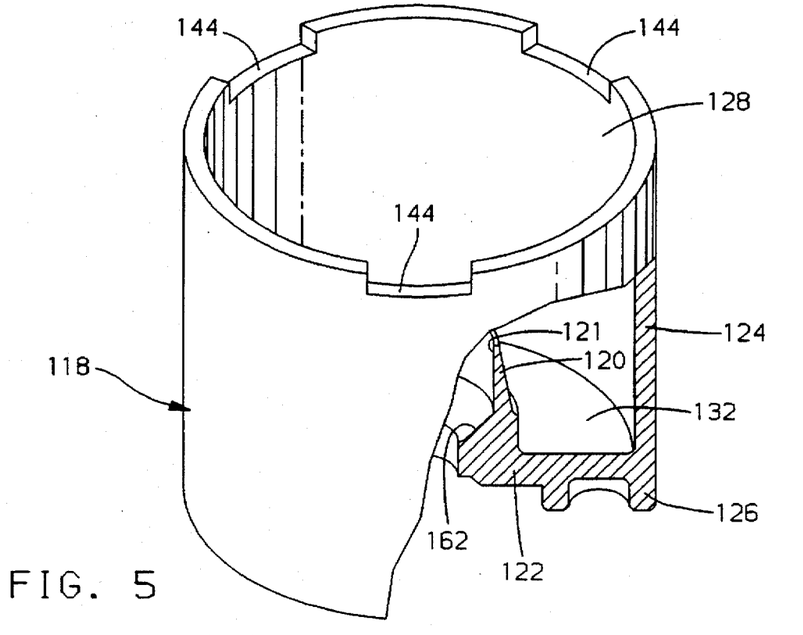
FIG. 5 is a perspective view, partially in section, of the primary pole piece of the actuator assembly for the exhaust gas recirculation valve of FIG. 1.

The actuator assembly 18 further includes a linear solenoid 116 which is installed in the actuator housing 56 and is connected to the second, distal end 96 of the valve stem 92. The solenoid 116 is operable to move the valve stem 92 such that the valve head 94 is moved into and out of engagement with the valve seat 52 to initiate and regulate the flow of exhaust gas through the passage 44 in the EGR housing 22. As shown in FIGS. 2 and 5, a primary pole piece 118 has a cup shaped configuration with a tapered center pole 120, a base 122 and a cylindrical outer wall 124. The outer wall 124 is dimensioned to permit sliding insertion of the pole piece into the open end 60 of the actuator housing 56. A key 126 extending from the base 122 of the pole piece 118 slidingly engages a hollow support member 64 in the actuator housing base 62 to position the pole piece. The open end 128 of the cup-shaped primary pole piece 118 receives a coil/bobbin assembly 130. The coil/bobbin assembly 130, having a substantially annular configuration, engages a corresponding annular groove 132 in the bottom of the primary pole piece 118 formed between the upwardly projecting, tapered center pole 120 and the outer wall 124.

Closure of the cup-shaped primary pole piece 118 is by a secondary pole piece 134 having a non-tapered cylindrical center pole portion 136 for insertion within the center opening 138 of the coil/bobbin assembly 130. The upper end of the secondary pole piece 134, as viewed in the Figures, is a flange 140 with one or more tabs 142 for engagement with corresponding positioning slots 144 in the circumference of the open end 128 of the wall 124 of primary pole piece 118. As thus far described, the magnetic circuit of the solenoid actuator 116 comprises primary pole piece 118, which establishes an extended magnetic circuit about a substantial portion of the coil 130, the secondary pole piece 134, and an armature 146 which is fixed to, and movable with, the second end 96 of the valve stem 92. The armature 146 is located and fixed, relative to the second end 96 of valve stem 92 with a retaining disk 97 having a flanged opening through which the end of the valve stem 92 passes and is spun, or otherwise flattened to positively engage the two components. The tapered pole portion 120 of the primary pole piece 118 and the non-tapered, or straight portion 136 of the secondary pole piece 134 define a cylindrical passage 152 having an axis which is substantially the same as that of the valve stem 92 and having a diameter which is slightly larger than that of the armature 146 to permit axial movement of the armature, and the attached valve stem, therein.

Figure 6:
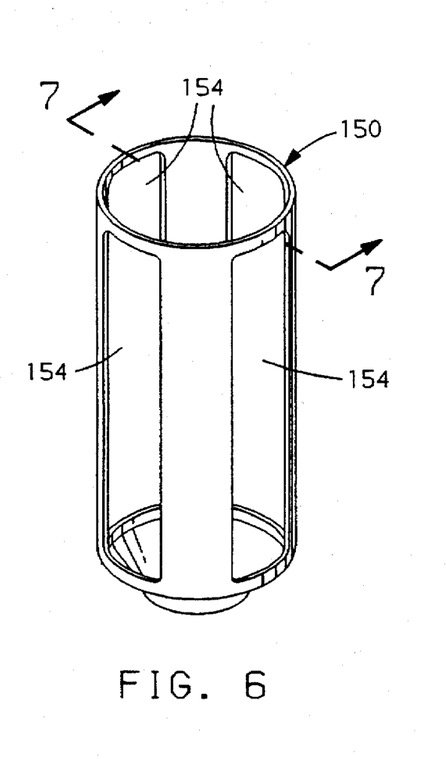
FIG. 6 is a perspective view of the air gap sleeve of the solenoid assembly for the exhaust gas recirculation valve of FIG. 1.
Figure 7:
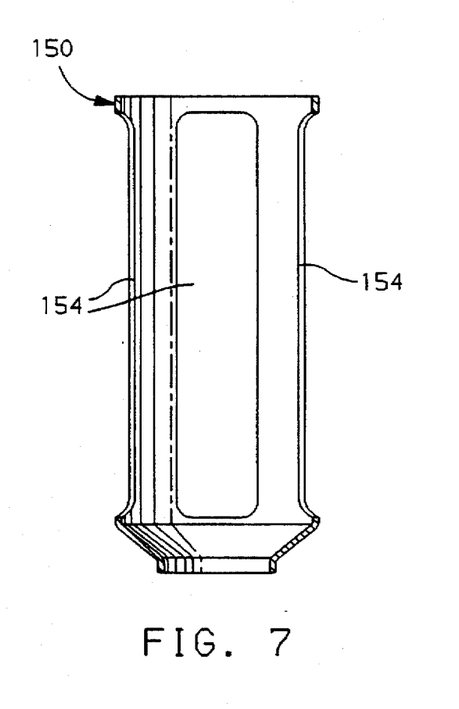
FIG. 7 is a sectional view of the air gap sleeve taken along line 7—7 of FIG. 6.

Critical to the operation of the armature within the solenoid assembly is the maintenance of a circumferential air gap 148 between the armature 146 and the pole pieces 118,134. Establishment of the air gap 148 in the present EGR valve is through the use of a non-magnetic sleeve 150 which is positioned in the cylindrical passage 152 of the solenoid between the pole pieces and the armature. As is shown in FIGS. 6 and 7, the sleeve 150 is constructed of a thin, non-magnetic material such as stainless steel or a temperature resistant polymer and has a series of slots 154 which extend axially. The slots 154 provide communication between the captive air volume 156 above the armature 146 and the space 158 below the armature to minimize the effect of pneumatic damping on the movement of the armature. Such damping effects are undesirable in that they adversely impact the response time of the actuator and, as such, the opening and closing performance of the valve itself. Unlike typical solenoid actuators which provide communication between upper and lower air spaces by passages through the armature, the present design utilizes the air gap to provide such venting. As a result, armature cross section is not compromised by the need to replace the material removed in locating the air passages.

In the linear solenoid actuator of the type contemplated in the preferred embodiment described, a linear relationship is desirable between force and current, over the entire range of armature, and hence, valve motion. The design of such solenoids must take into consideration the non-linearity of the magnetic material used in its construction and the relationship between the flux density and the magnetic forces. In known linear actuators used in EGR valves, the function of the tapered pole piece is to produce a linear axial force versus current relationship over the range of motion. The magnetic efficiency of the devices is generally less than optimum due to substantial, radially directed magnetic flux and, as a result, it is difficult to maintain the desired linearity. To address the deficiencies inherent in typical linear EGR solenoid designs, armature 146 has a tapered portion 160 at its end adjacent to the tapered primary center pole piece 120. The tapered portion 160 of the armature 146 is angled in a direction that is opposite that of the tapered stationary pole 120. The tapered armature improves the axial force generated by a given current by providing a focused path for leakage flux, shown in FIG. 8 as "A", from the tapered portion 160 to the tapered center pole 120 of the primary pole piece 118. By directing the leakage flux across the working air gap in the area of the armature taper 160 and the tapered center pole 120, the force generated in the direction of the valve stem axis is increased while still maintaining the linear characteristics provided by the tapered stationary pole 120 of the primary pole piece 118.

Figure 9:
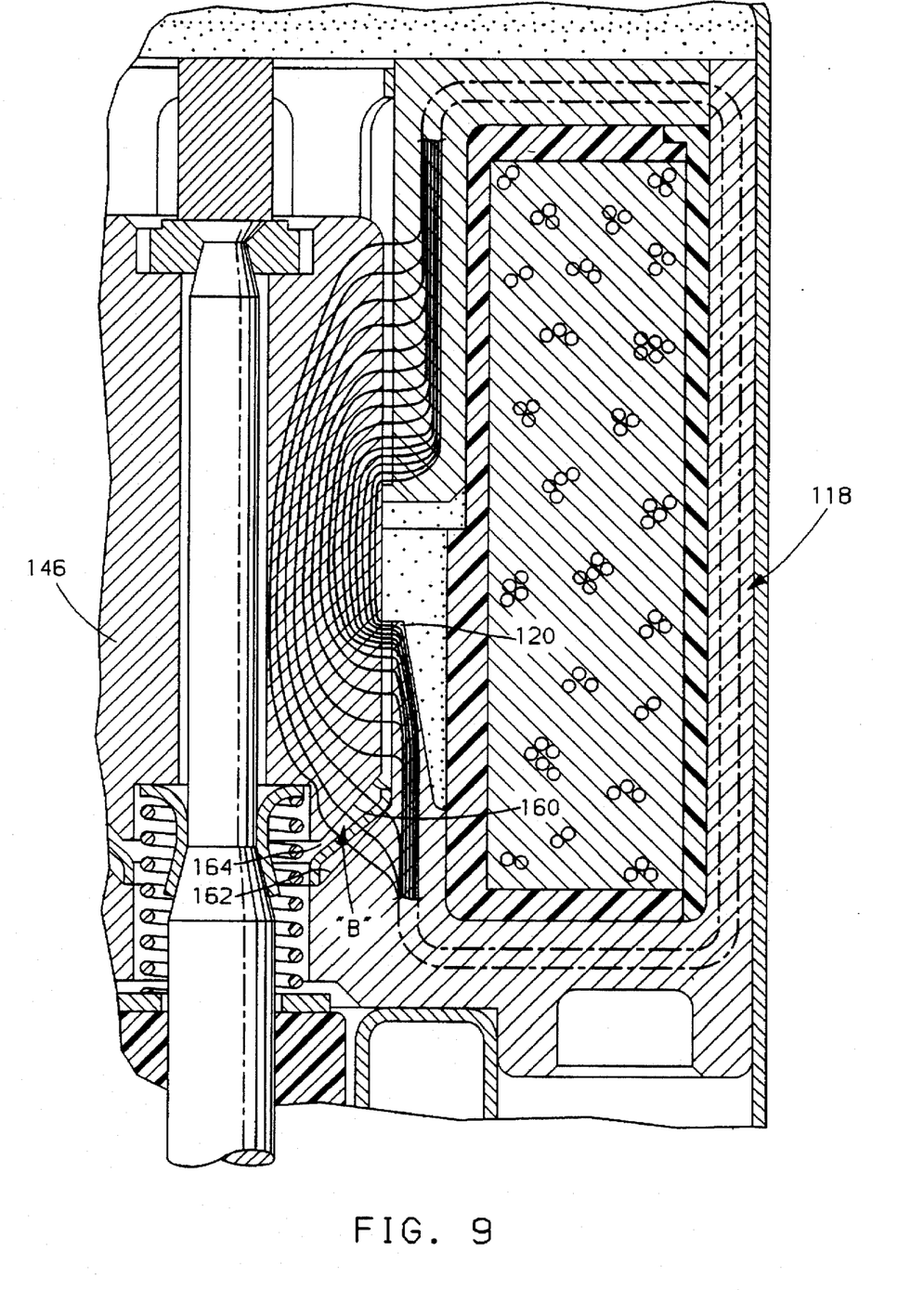

In addition to the armature taper 160, a corresponding, tapered extension 162 projects inwardly from the inside diameter of the tapered stationary pole 120. The tapered extension 162 substantially parallels the armature taper 160 and establishes an additional axial force component as it provides an additional magnetic flux field path, shown at "B" in FIG. 9. An additional force component is consequently generated through flux field "B" and is effective during high volume flow operation of the valve 10 in which the valve member 94 approaches the full open position as the length of the gap 164 between the tapered pole extension 162 and the tapered face 160 of the armature 146 will enhance the axial force generated. The tapered armature end 160 and tapered pole piece extension 162 provide an additional degree of design freedom which is not available in typical linear solenoid actuators. The added design freedom results in higher axial forces acting on the armature in all positions.

Closure of the actuator assembly 18 is through the pintle position sensor assembly 20. The pintle position sensor has a biased follower 166 which contacts the upper surface of the retaining disk 97 and moves in concert with the valve shaft 92 to track its position and, as a result, the position of valve 94 relative to seat 52. The position of the valve shaft 92 is translated into an electrical signal which is transmitted via the electrical connections 168 to an appropriate controller (not shown). The pintle position sensor 20 has a flange 170, extending about the perimeter thereof. Although the case of the pintle position sensor is preferably constructed of a durable polymeric material, the flange has a rigid metallic sheath or edge 172 to which the body of the sensor is integrally cast. The edge 172 of the sensor 20 is captured, along with an elastomeric seal 174 by the upper edge 176 of the open end 60 of the actuator housing 56 which is swaged over the flange 170. The use of the integrally molded metal edge 172 on the pintle position sensor 20 limits dimensional change in the flange over time which could interfere with the accurate operation of the sensor 20.

The preferred operation of the EGR valve 10 shall now be described with reference to FIGS. 2 and 3. FIG. 2 shows the EGR valve in a closed position as might be encountered during a wide-open throttle setting when no exhaust gas is required to be recirculated to the engine intake. In the closed position, the coil 130 remains in a non-energized state and, as a result, no force creating magnetic flux fields are established in the actuator 18. The spring 112 biases the armature 146 and attached valve assembly towards the closed position to thereby seat the valve member 94 against the valve seat 52 to thereby prevent the flow of exhaust gas from the exhaust gas passage 178 in the engine 12 to the intake passage 180. In the closed position shown in FIG. 2, passage 44 in the EGR base 14 is exposed to manifold vacuum from passage 180 in engine 12. However, due to the seal established at the interface of the valve stem opening 54 of the EGR base housing 22 and the valve stem passage 80 of the actuator housing 56, unmetered exterior air is prevented from entering the engine intake where it could degrade engine performance.

Figure 8:
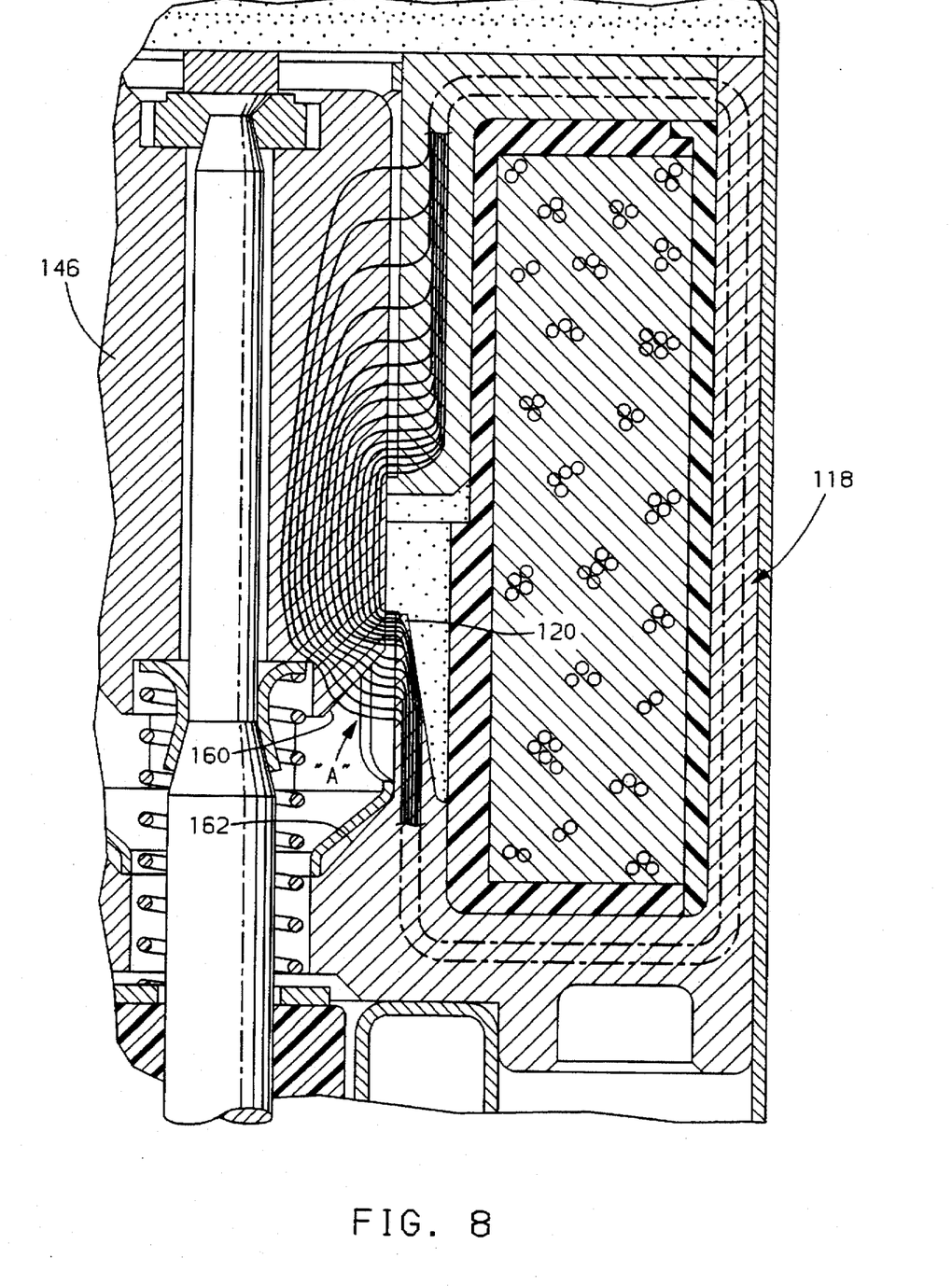
FIGS. 8 and 9 are partial, sectional views of the actuator assemblies of the exhaust gas recirculation valve of the present invention shown in different modes of operation.

Upon a determination by an associated controller that engine operating conditions warrant the introduction of EGR to the intake manifold, a current signal is transmitted to the coil 130 via electrical connectors 168 to establish a magnetic field "A", shown in FIG. 8. The magnetic field "A" causes an opening force to be exerted on the armature 146 in the direction of the valve stem axis and opposing the bias exerted by the spring 112, and the differential pressure across the valve member 94, in the closing direction. As the force generated by the magnetic field "A" exceeds the spring bias and differential pressure load, the armature 146 and the attached valve assembly 16 move axially such that the valve member is unseated from valve seat 52, as illustrated in FIG. 3. As the valve opens, exhaust gas flows from the exhaust gas passage 178 through the passage 44 in the EGR base housing 22 to the intake passage 180. Exhaust gas is prevented from escaping the EGR valve 10 by the seal established at the interface of the valve stem passage 80 of the actuator housing member 56 and the valve stem opening 54 in the EGR base housing 22. Simultaneously, passage of exhaust gas from the base assembly 14 to the actuator assembly 18 is blocked by the face seal established between bearing 98 and shoulder 84 and the close tolerance of the valve stem in the bearing opening 100.

The foregoing description of the preferred embodiment of the invention has been presented for the purpose of illustration and description. It is not intended to be exhaustive nor is intended to limit the invention to the precise form disclosed. It will be apparent to those skilled in the art that the disclosed embodiments may be modified in light of the above teachings. The embodiments described are chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A valve assembly for metering exhaust gas to the intake system of an internal combustion engine comprising a base housing having first and second openings communicating through a passage, said first opening having a valve seat extending thereabout and operable with a valve member to meter the flow of exhaust gas through said passage, and a third opening coaxially aligned with said first opening and configured to receive a stem of said valve member therethrough, said valve assembly further comprising an actuator assembly in communication with said stem of said valve member for movement of said valve member into and out of engagement with said valve seat, said actuator assembling comprising a single piece, extruded housing which includes sides, a bottom, hollow support members extending from said bottom engageable with said base housing, for relative support of said base housing on said base housing, and an extension projecting from said housing bottom comprising a walled portion terminating at an open bottom to define a valve passage for circumjacent disposition within said third opening in said base, about a portion of said stem of said valve member extending through said third opening, to thereby define a sealed passage for said stem of said valve member from said base housing into said actuator assembly.

2. A valve assembly for metering exhaust gas to the intake system of an internal combustion engine comprising a base housing in communication with an exhaust source having a first opening operable with a valve member to meter the flow of exhaust gas through said base housing and a second opening aligned with said first opening for the passage of an end of said valve member therethrough, said valve assembly further comprising a single piece, extruded housing which includes sides, a bottom, hollow support members extending from said bottom engageable with said base housing, for relative support of said base housing on said base housing, and an extension projecting from said housing bottom comprising a walled portion terminating at an open bottom to define a valve passage for circumjacent disposition within said third opening in said base, about a portion of said stem of said valve member extending through said third opening, to thereby define a sealed passage for said stem of said valve member from said base housing into said actuator assembly.

3. A valve assembly for metering exhaust gas to the intake system of an internal combustion engine comprising a base housing in communication with an exhaust source having an opening operable with a valve member to meter the flow of exhaust gas through said base housing and a valve stem opening aligned with said opening for passage of a distal end of said valve member therethrough and out of said base housing, said valve assembly further comprising an actuator assembly in communication with said distal end of said valve member, said actuator assembly comprising a housing which includes sides, a bottom and a stepped extension projecting from said housing bottom comprising a first walled portion terminating at a shoulder to define a bearing housing and a second walled portion terminating at an open bottom to define a valve passage for disposition within said valve stem opening in said base about said distal end of said valve member extending through said valve stem opening to define a sealed passage between said base and said actuator assembly for passage of said distal end of said valve member, said actuator assembly further comprising a bearing member received in said bearing housing having an opening through which said distal end of said valve member passes and a bottom surface engaging said shoulder to define a seal against exhaust gas passage from said base through said valve stem passage to said actuator housing, said bearing member and said walled portion of said bearing housing defining a clearance therebetween to accommodate radial movement of said bearing member and said distal end of said valve member passing through said bearing opening.

4. A valve assembly for metering exhaust gas to the intake system of an internal combustion engine, as defined in claim 3, said bearing biased against said shoulder to maintain said seal during axial movement of said valve member through said opening in said bearing.

5. A valve assembly for metering exhaust gas to the intake system of an internal combustion engine, as defined in claim 4, said actuator assembly having a spring member positioned to exert said bias on said bearing member and a disk member interposed between said spring member and said bearing to define a slip surface therebetween.

6. A valve assembly for metering exhaust gas to the intake system of an internal combustion engine comprising a base housing having a first opening in communication with the intake system of said engine, a second opening in communication with an exhaust manifold of said engine and a valve seat surrounding one of said openings, operable with a valve member to meter exhaust gas through said base housing, and a valve stem opening in coaxial alignment with said valve seat for passage of an end of said valve member therethrough and out of said base housing, said valve assembly further comprising an actuator assembly in communication with said end of said valve member, said actuator assembly operable to move said valve member into and out of engagement with said valve seat and comprising an electromagnetic solenoid actuator having a coil member energizable to move an armature therein to operate said valve member, said electromagnetic solenoid actuator disposed in a single piece, extruded housing which includes sides, a bottom, hollow support members extending from said bottom for engagement with said base housing for relative support of said base housing and said actuator, and a stepped extension projecting from said housing bottom comprising a first walled portion terminating at a shoulder to define a bearing housing and a second walled portion terminating at an open bottom to define a valve passage for disposition within said valve stem opening in said base, about a portion of said distal end of said valve stem extending through said opening, to thereby define a sealed passage for said end of said valve member from said base into said actuator assembly, said actuator assembly further comprising a bearing member received in said bearing housing and having an opening through which said end of said valve member passes and is supported for axial movement therein, and a seal surface engaging said shoulder of said bearing housing to define a seal therebetween against exhaust gas passage from said base through said valve stem passage to said actuator housing, said bearing and said walled portion of said bearing housing defining a clearance therebetween to accommodate radial movement of said bearing and said end of said valve member supported thereby.

7. A valve assembly for metering exhaust gas to the intake system of an internal combustion engine, as defined in claim 6, said hollow support members comprising extruded portions of said housing bottom and having means for attachment of said actuator housing to said base housing including an opening therein and fasteners extending from said openings for engagement with said base member.

8. A valve assembly for metering exhaust gas to the intake system of an internal combustion engine, as defined in claim 6, said seal, defined by said seal surface of said bearing and said shoulder of said bearing housing oriented normal to the axis of said valve member.

* * * * *